United States Patent Office 3,029,594
Patented Apr. 17, 1962

3,029,594
MATCHED TURBOCHARGER AND ENGINE
Ralph Miller, 1943 N. Summit Ave., Milwaukee, Wis.
Continuation of abandoned application Ser. No. 622,056, Nov. 14, 1956. This application Nov. 10, 1960, Ser. No. 68,389
5 Claims. (Cl. 60—13)

This is a continuation of Serial No. 622,056, filed November 14, 1956, now abandoned.

My invention resides in the field of internal combustion engines and is a new and improved engine structure and a method of operating an engine whereby the engine can be automatically and accurately controlled without expensive and unnecessary complicated control mechanism.

A primary object of my invention is a new and improved engine of the gas fueled, spark fired type, and a method of operating it, whereby a mixture of air and fuel is entrapped in the cylinders which has an approximately constant air-fuel ratio as the load varies over a selected load range.

Another object is an engine and method of the above type which does not use throttling or any throttling means in the inlet manifold to maintain an approximately constant air-fuel ratio.

Another object is a supercharged, intercooled, spark fired gas engine which is constructed to entrap substantially less than the full volumetric capacity of the cylinder, and the exhaust driven supercharger or turbocharger is matched with the engine to give a mixture in the cylinders with a constant air-fuel ratio.

Another object is a method of the above type which can be carried out on either two or four cycle gas engines of all types.

Other objects will appear from time to time in the ensuing specification and drawings in which.

Figure 1:
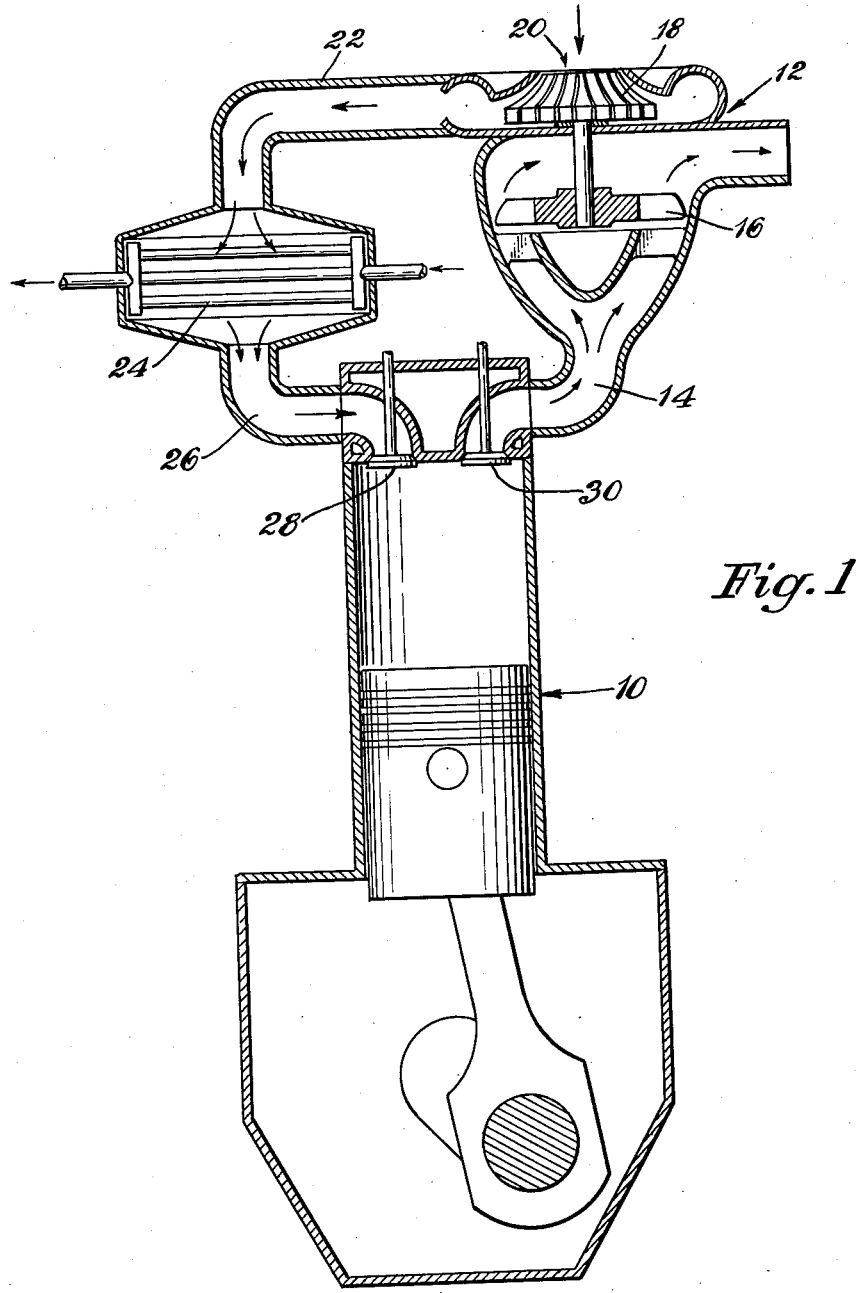
FIGURE 1 is a diagrammatic representation of a four cycle engine embodying my invention.

In FIGURE 1, I have shown a four cycle engine 10 which has a supercharger 12 connected to the exhaust passage 14, so that a turbine 16 in the supercharger uses the heat of the exhaust gas to drive an air compressor 18. Atmospheric air is drawn in through a suitable inlet 20, compressed by the compressor, and supplied through a suitable duct 22 to an intercooler 24 where the heat of compression is withdrawn by a suitable cooling fluid, such as water. The compressed, cooled air then travels through an inlet duct 26, through one or more inlet valves 28, into the cylinder, and the burnt gases are exhausted through one or more outlet or exhaust valves 30.

A supercharged, intercooled engine is well known, and my invention can be practiced on either two or four cycle engines, and I have illustrated a four cycle engine in FIGURE 1 merely as an example.

In my copending application Serial No. 311,032, filed September 23, 1952, now U.S. Patent No. 2,773,490, issued December 11, 1956, I disclosed a method of operating both two and four cycle engines by supplying gas fuel to the engine to form an air-fuel mixture in the cylinders. The engine was supercharged and intercooled, and the mixture was fired by a spark. Either the inlet or the exhaust valves or both were timed so that substantially less air than the full volumetric capacity of the cylinders would be entrapped for compression. Thus the compression volume ratio was substantially less than the expansion volume ratio, and the values of these two ratios are selected somewhat independently of each other. The expansion volume ratio is selected for thermal efficiency and may, for example, be 12 to 1. The effective compression volume ratio is selected for the particular gas fuel used, so that the volume of air entrapped or retained in the cylinder by closing either the inlet or exhaust valves or both substantially ahead of or substantially behind bottom dead center in a four-cycle engine, for example, is related to the combustion chamber volume, so that the temperature rise due to the effective compression wil not cause detonation or pre-ignition of the mixture due to an excessive final compression temperature of the mixture as it is compressed into the combustion chamber.

As an example of the above, when using natural gas, a compression volume ratio of 8 may be used, which would give a final compression temperature of the air in the mixture of 2.25 times the temperature of the air in the inlet manifold 26. Natural gas is only one example, and if another gas is used which has a lower octane rating so that it would detonate at this final compression temperature, I can reduce the compression volume ratio to 6, which would result in a final compression temperature of 2.01 times the inlet manifold temperature of the air. It should be remembered that the temperature rise in the cylinders due to compression is a function of the volume ratio and inlet manifold temperatures and is independent of the pressures.

In the exhaust driven supercharger, the temperature of the inlet atmosphere air is elevated substantially by compression, and the intercooler withdraws a part or all of the heat of compression. If natural gas is used as the fuel and the compression volume ratio is 8 to 1, the final compression temperature will be 800° F. But if a lower octane fuel is used and the compression volume ratio is 6 to 1, the final compression temperature will be approximately 666° F. For best performance and good combustion efficiency, a gas engine must operate with a substantially constant air-fuel ratio mixture at all loads from no load to ful load.

In my above referred to co-pending application, I maintain a constant air fuel ratio mixture in the cylinders by varying the timing of one or more values, for example either the inlet or exhaust values in a four cycle engine, a special compression control valve in a loop scavenged two cycle engine, or the valves in the cylinder head of a uniflow two cycle engine. Variably timing one or more valves requires expensive control mechanism, for example servo motors, shiftable cam followers, and the like. One of the objects of this invention, as an improvement upon the invention in my prior copending application, is to maintain a substantially constant air-fuel ratio mixture in the cylinders without throttling and with constantly timed valves, so that no variable valve timing mechanism is required.

Gaseous fuel can be supplied to the cylinder by any suitable gas valve or the like, so that gas fuel is supplied in quantities which vary in direct relation to the load. If the load falls, the gas valve will admit less fuel; and to maintain a constant air-fuel ratio, less air must be supplied. One way of cutting down the weight of air entrapped in the cylinder is to throttle the inlet with a conventional butterfly valve, for example either ahead of or behind the supercharger. But this is grossly inefficient and involves a great deal of negative work in the engine. Another way is to variably time the valves, as in my prior application mentioned above, so that the weight of air entrapped to the cylinder will decrease as the load decreases and the ratio will remain constant. As is known, the weight of air entrapped will be at a maximum if the valves are closed at the point of maximum cylinder fill which depends upon engine speed, design and length of the inlet passage and other known factors. Thus, to entrap less weight of air requires that the valves be closed at a time other than the time of maximum cylinder fill.

By this invention, the exhaust driven supercharger is constructed so that it will automatically, in response to the energy in the exhaust gases, match the load requirements on the engine, so that the weight of air supplied by the supercharger alone, when cooled by the intercooler, maintains the air-fuel ratio constant in the cylinders. I use very little, if any, throttling, and if throttling is necessary, it is only used at light loads. Thus, as used herein, the expression "a varying load range" should be interpreted to include a substantial part of the load range as well as the entire permissible load range. If, upon decreasing load, the absolute air pressure in the manifold, as supplied by the supercharger, falls at a slower rate than the load, then the volume of air entrapped in the cylinder for compression must be decreased. But if the absolute air pressure in the manifold, as supplied by the supercharger, falls at a faster rate than the load, then the volume of air entrapped in the cylinder must be increased. Directly between these two examples there is a point where the absolute air pressure in the manifold varies practically in direct relation to the load. Thus the valves can close at a constant time to entrap substantially less than the full volumetric capacity of the cylinder and the weight of air entrapped will exactly match the quantity of fuel supplied, so that the air-fuel ratio remains approximately constant as the load varies.

Prior to my invention, conventional supercharger practice used pressure ratios of approximately 1.3 to 1.4. In the last few years, the pressure ratio of superchargers has increased and superchargers are available having pressure ratios of 2 to 1 and above. To maintain a substantially constant air-fuel ratio mixture in the cylinder with constant timing of the valve, I use a supercharger having a pressure ratio of approximately 2.5 at full load.

Figure 2:
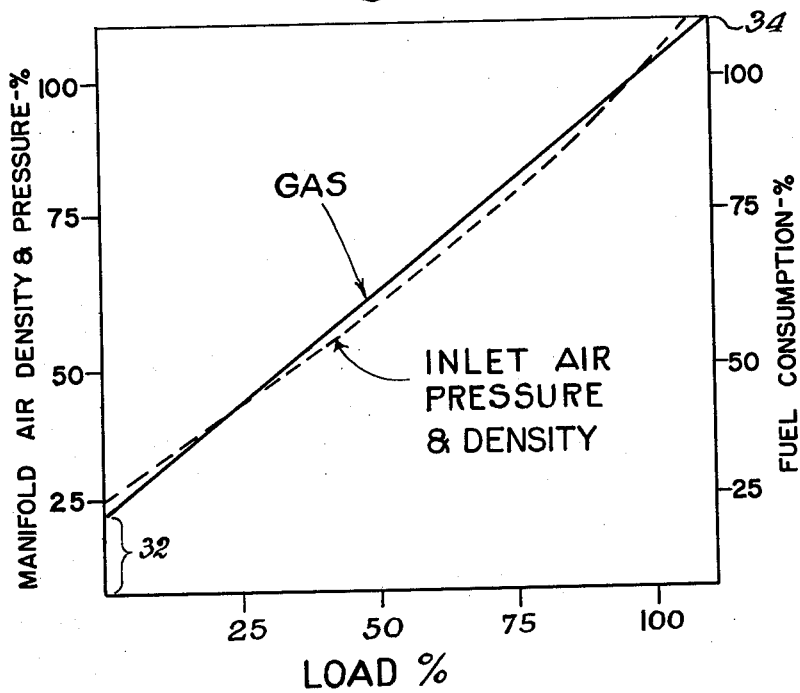
FIGURE 2 is a diagram showing the fuel and air pressure characteristics of the engine as the load varies.

In FIGURE 2, I show a load diagram in which the gas consumption is indicated as a straight line running from an idling quantity 32 to an overload quantity 34. The dotted line is the inlet air pressure and density in the inlet manifold as supplied by the exhaust driven supercharger, and it should be noted that I might have an absolute pressure at full load slightly in excess of 35 lbs. per sq. in. A supercharger with these characteristics will provide an inlet manifold pressure which varies almost directly with the gas line as indicated by the dashed inlet air pressure line. At each end of the pressure line, the air pressure is slightly greater than the related quantity of fuel and, in the central portion of the graph, the quantity of inlet air is slightly less than the related quantity of fuel. The two lines will not exactly coincide, however, by properly selecting the pressure ratio, they can be made to approach each other so closely at all points that a throttle is not needed and the valves can be closed at a constant time in the engine cycle.

Figure 3:
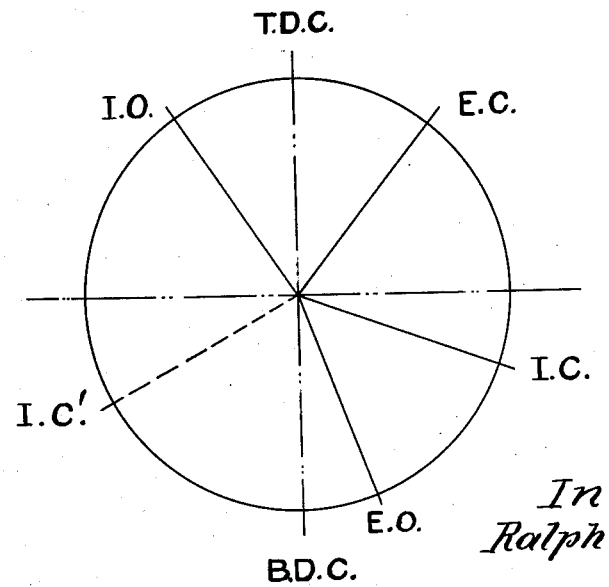
FIGURE 3 is a valve timing diagram.

In FIGURE 3, I have shown a valve timing diagram for a four cycle engine in which the inlet and exhaust valves are overlapped at top dead center to provide scavenging, the inlet valve opening at I.O. before top dead center and the exhaust valve closing at E.C. after top dead center. The inlet valve closes at I.C. a substantial amount ahead of bottom dead center. I have indicated this closing point approximately 60° before bottom dead center, but 45° will also work satisfactorily. This point of closing of the inlet valve determines the compression volume ratio and, as indicated by the two examples given hereinabove, this compression volume ratio is chosen in relation to the detonation and pre-ignition temperature of the particular fuel being used. I have also indicated, by a broken line, that the inlet valve can be held open beyond bottom dead center and closed at I.C.' a substantial distance after bottom dead center, and again the exact closing point is predicated upon the detonation characteristics of the selected fuel. I have found that it is advantageous to close the inlet valve after bottom dead center, as at I.C.', in high speed engines, so that the air and fuel will have sufficient time to enter the cylinder.

I have not indicated the timing of the gas valve nor have I shown a gas valve in FIGURE 1, because it is considered conventional. I might say that the gas valve should be timed so that no fuel mixture is lost through the exhaust valve during scavenging.

Some of the important points of my invention are as follows:

(a) I maintain a constant air-fuel ratio mixture in the cylinders at all times as the load varies.

(b) I use very little, if any, throttling in the inlet side.

(c) I entrap substantially less than the full volumetric and weight capacity of the cylinders.

(d) My invention can be applied to either a two or four cycle engine and also to any conventional type of two cycle engine.

(e) I find that scavenging with valve overlap and a properly timed gas valve is preferable to the use of a carburetor.

(f) My exhaust driven supercharger has a pressure ratio between 2 to 1 and 3 to 1, and approximately 2.5 to 1, so that this supercharger, when combined with the intercooler, provides a variable quantity or weight of air which approximately matches the fuel being supplied, so that the mixture in the cylinders has a constant air-fuel ratio.

(g) All valves can be constantly timed and no expensive variable valve timing mechanism is required.

Whereas, I have shown and described a preferred form of my invention with various details and suggested other alternatives, it should be understood that numerous alterations, modifications and substitutions can be made without departing from my essential theme, and I therefore wish that the invention be unrestricted, except as by the appended claims.

I claim:

1. A method of operating a spark-fired gas engine over a varying load range, including the steps of precompressing the inlet air to an elevated temperature and pressure that vary directly with the load, withdrawing the heat of precompression from the air by cooling it to a reduced temperature, supplying the precompressed cooled air to the engine, supplying gas fuel to the engine in direct relation to the load within the range, using the energy in the exhaust gases to perform the precompressing step, entrapping a constant volume of air in the cylinders that is substantially less than the full volumetric capacity of the cylinders by closing the valves at a constant time in the engine cycle regardless of the load, closing the valves at a time other than the time of maximum cylinder fill so that, at the maximum load in the range, the effective compression ratio is substantially less than the effective expansion ratio and the weight of air entrapped is substantially less than the weight that would be entrapped by closing the valves at the time of maximum cylinder fill, and matching the weight of air supplied by the precompressing step to the load on the engine over the load range so that the weight of air in the entrapped constant cylinder volume will give a mixture of air and gas in the cylinder which has a substantially constant air-fuel ratio over the load range due alone to the rate at which air is supplied.

2. The method of claim 1 in which the entrapped volume is such, in relation to the temperature of the air after the cooling step, that the final compression temperature will be less than the detonation and autogenous temperature of the fuel.

3. An internal combustion engine constructed to operate over a varying load range and having an exhaust driven supercharger and intercooler connected to it so that the supercharger will be driven by exhaust gas from the engine and the supercharger and intercooler together will supply high pressure cool inlet air to the engine, means for supplying gas-fuel to the cylinders, at least one valve in each cylinder, and means for closing the valve at a constant time in the engine cycle other than the time of maximum cylinder fill to provide a selected effective reduced cylinder volume which is substantially less than the entire volumetric capacity of the cylinder thereby providing an effective expansion stroke that is materially greater than the effective compression stroke, the weight of air entrapped in the constant volume being substantially less than the weight that could be entrapped by closing the valve at the time of maximum cylinder fill, the exhaust driven supercharger having a selected pressure ratio such that the weight of air supplied at each load by the supercharger alone, when cooled by the intercooler, will result in an air-fuel mixture in the effective reduced cylinder volume which has an approximately constant ratio at each load.

4. The structure of claim 3 in which the pressure ratio of the supercharger is approximately 2.5.

5. The structure of claim 3 in which the valve is closed during the suction stroke of the piston substantially ahead of bottom dead center to entrap substantially less than the full cylinder capacity.

References Cited in the file of this patent

UNITED STATES PATENTS

| | | |
|---|---|---|
| 2,082,780 | Buchi | June 8, 1937 |
| 2,292,233 | Lysholm | Aug. 4, 1942 |
| 2,565,198 | Boyer | Aug. 21, 1951 |
| 2,670,595 | Miller | Mar. 2, 1954 |